UNITED STATES PATENT OFFICE.

FAUSTIN HLAVATI, OF BERLIN, GERMANY.

TREATING SUGAR LIQUORS.

1,054,414.  Specification of Letters Patent.  Patented Feb. 25, 1913.

No Drawing.   Application filed January 30, 1912.  Serial No. 674,314.

*To all whom it may concern:*

Be it known that I, FAUSTIN HLAVATI, a subject to the Emperor of Austria-Hungary, residing at Berlin, Germany, have invented certain new and useful Improvements in Treating Sugar Liquors, of which the following is a specification.

In prior patents I have described a process for purifying sugar liquors in which to the juice coming from the diffusers certain sulfates, preferably ferrous sulfate are added and the juice after the ordinary operations of chalking and saturating is treated with sulfids, for instance calcium sulfid in order to completely separate the iron compounds which are in an extraordinary manner fast bound to the organic non sugar substances of the solution. This process involves certain difficulties partially resulting even from its advantages. The juices produced by this process are extraordinarily pure and therefore a snow-white product is obtained, but as the juices are excellently clear the heat of the heating devices which are in sugar manufacture exclusively heated by direct or indirect steam is most easily transferred to the juice and therefore the easier produces the decomposition of the sugar which is well known as the so-called caramelization. Furthermore, by adding sulfates the alkali salts contained in the raw juice are transformed to sulfates which alkali sulfates seem to have the strange property of likewise facilitating caramelization. Therefore I was obliged to take good care in further improving the process in such a manner that the said injurious caramelization would be surely avoided without disturbing the reactions upon which the success of the process depends. I was surprised to find that the separation of the iron compounds by sulfids can be effected at considerably lower temperatures than it has been generally believed heretofore.

Therefore my invention consists in that the temperature is no more increased up to the moment in which calcium sulfid or the like is added, and the calcium sulfid is added at a temperature below 75° centigrade, preferably at 45 to 50°. But also during the following operations it must be possibly avoided to increase the temperature, especially during the evaporation to thick-juice. In this operation care must be taken that the heating devices never attain a temperature of 100° and that the proportions of the apparatus and the circulation of the juice are regulated in such a manner that the juice does not attain on an average higher temperatures than of 50 to 60°.

It may be of advantage to add to the juice a certain quantity of zinc dust after the calcium sulfid has been added. By the addition of zinc dust the apparatus is protected against the nascent sulfurated hydrogen, an excess of alkali is neutralized and the malodorous sulfureted hydrogen is absorbed.

I claim:—

1. The process of purifying sugar liquors which consists in adding metallic sulfates to the juices from the diffusers, heating the said juices to temperatures below 75° C., adding a sulfid or sulfids at temperatures below 75° C., and evaporating in such a manner that the heating devices do not attain a temperature of 100° C.

2. The process of purifying sugar liquors which consists in adding metallic sulfates to the said liquors, heating the said liquors to temperatures below 75° C., adding a sulfid or sulfids at temperatures below 75° C., adding zinc dust, filtering off, and evaporating the solution in such a manner that the heating devices do not attain a temperature of 100° C.

3. The process of purifying diffusion juices of sugar, which consists in adding metal sulfates and then chalk to the said juices to produce compounds of metals and non-sugar substances, and then treating the juices with a sulfid or sulfids at temperatures below 75° centigrade, in order to decompose the said metallic compounds and to separate the said metal and the said non-sugar substances at the same time.

4. The process of purifying diffusion juices of sugar, which consists in adding ferrous sulfate and then chalk to the said juices to produce compounds of iron and non-sugar substances, and then treating the juices with a sulfid or sulfids at temperature below 75° centigrade, in order to decompose the said iron compounds and to separate the said iron and the said non-sugar substances at the same time.

In testimony whereof I affix my signature in presence of two witnesses.

FAUSTIN HLAVATI.

Witnesses:
  HENRY HASPER,
  WOLDEMAR HAUPT.